June 30, 1964    L. F. KOLARIK    3,139,189
ROTATABLE BABY FOOD TRAY
Filed May 28, 1962

INVENTOR.
LOUIS F. KOLARIK
BY
Charles L. Lorrenbach
atty.

United States Patent Office 3,139,189
Patented June 30, 1964

3,139,189
ROTATABLE BABY FOOD TRAY
Louis F. Kolarik, 606 Ardmore Ave., Erie, Pa.
Filed May 28, 1962, Ser. No. 198,376
1 Claim. (Cl. 211—131)

This invention relates to racks and, more particularly, to rotatable racks.

The present invention relates to a rack which has spaced rotatable shelves supported on a base. A cup is supported on top of the upper shelf for receiving premiums or the like and a clip is supported in the top of the cup to receive an order blank, card of instructions, or the like.

It is, accordingly, an object of the present invention to provide an improved rack.

Another object of the invention is to provide a combination rotatable rack and cup combination.

A further object of the invention is to provide a rack which is simple in construction, economical to manufacture, and simple and efficient to use.

With the above and other objects in view, the present invention consists of the combination and arrangement of parts hereinafter more fully described, illustrated in the accompanying drawing and more particularly pointed out in the appended claim, it being understood that changes may be made in the form, size, proportions, and minor details of construction without departing from the spirit or sacrificing any of the advantages of the invention.

Figure 1:
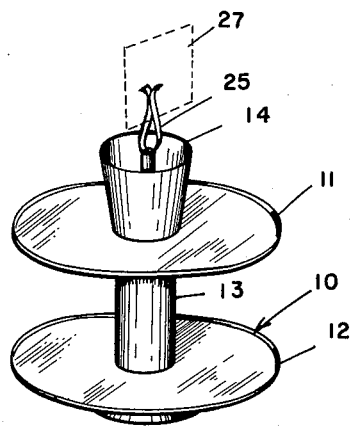
FIG. 1 is an isometric view of a rack according to the invention.
Figure 2:
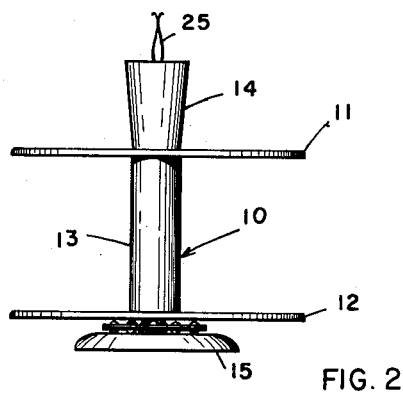
FIG. 2 is a side view of the rack shown in FIG. 1.
Figure 3:
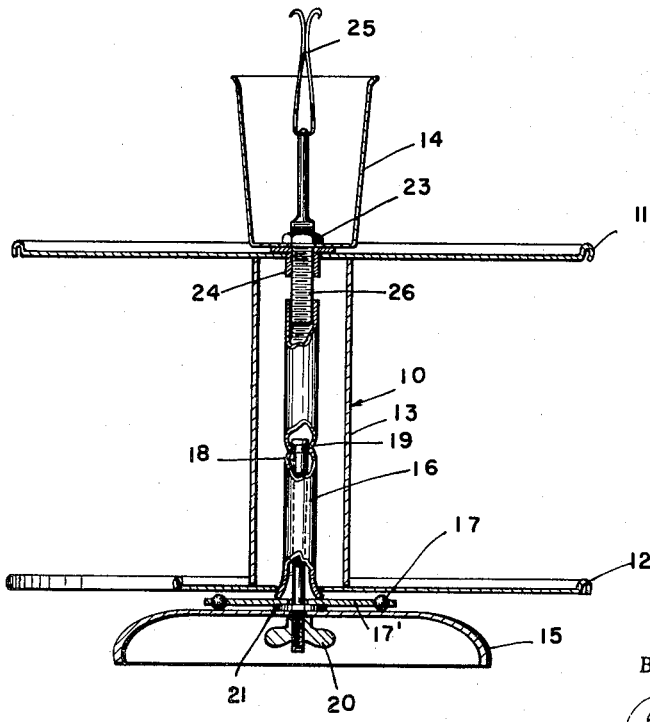
FIG. 3 is a longitudinal cross sectional view of the rack.

Now with more particular reference to the drawing, a rack 10 is shown having an upper tray 11 and a lower tray 12 spaced vertically from each other and held in spaced relation by a hollow cylindrical spacer 13. A cup 14 is supported on top of the upper tray 11. The upper tray has a hole therein which receives a spacer 24. The spacer 24 has a flange disposed between the bottom of the cup 14 and it rests on the top surface of the tray 11.

A base 15 has a concave lower surface with smoothly curving outer edges. The center part of the top surface thereof is flat and a bearing 17 has balls which rest on the bottom surface of the tray 12 and on the flat top surface of the base 15. The bearing 17 has a plate like race 17′ for the balls. This race is supported on top of a washer 21 which rests on top of the base 15 and spaces the race 17′ thereabove.

A tube 16 extends through the spacer 13 and is concentric therewith. A shank 18 has a peripheral groove in the upper end thereof at 19. The tube 16 is distorted into the groove 19 to rotatably hold the shank 18 therein.

The lower end of the shank is threaded and extends through the central hole in the plate of the bearing and through a hole in the bottom of the base 15. The flange on the spacer 24 overlies the tray 11. The lower flared end of the tube 16 extends through a hole in the bottom tray and rests on the bottom of it. Thus, the flared end of the tube 16 and nut 23 clamp the cup 14, trays 11 and 12, and spacer 13 together as a unit. Thus, the trays 11 and 12 and cylindrical spacer 13 rotate as a unit; that is, spacer 13 rests on tray 12 and tray 11 rests on spacer 13. A wing nut 20 is received on the threaded end of the shaft 18 and exerts a force through the lower flared end of tube 16 which rigidly holds the bearing race 17′ to the base.

The upper end of the tube 16 is internally threaded and threadably receives a connector 26. The upper end of the connector 26 is threadably received in spacer 24 and, therefore, holds the lower tray 12 and top tray 11 in clamped relation between the spacer 24 and the lower flared end of the tube 16.

A nut 23 on the connector 26 clamps the cup 14 to the spacer 24. The connector 26 extends upwardly and has a bifurcated spring clip 25 on its upper end. The bifurcated spring clip 25 is of a type familiar to those skilled in the art. It has two legs and is adapted to receive an order blank, instructions for the premium, or the like such as indicated at 27. The cup could contain premium cards, certificates, slips, other articles, or actual premiums such as flatware, pencils, or notions.

The foregoing specification sets forth the invention in its preferred practical forms but it is understood that the structure shown is capable of modification within a range of equivalents without departing from the invention which is to be understood is broadly novel as is commensurate with the appended claim.

The embodiments of the invention in which an exclusive property or privilege is claimed are defined as follows:

A rack comprising a round base having a convex lower surface and a generally flat upper surface, spaced, round, flat, disk like trays disposed in generally parallel planes above said base, a hollow cylindrical member disposed between said trays and holding them in fixed spaced relation, a bearing between the lower of said trays and said base, said bearing having balls engaging the bottom of said lower tray and the top of said base, a tube in said cylindrical member, a shank in said tube and extending from the lower end thereof, said shank having a peripheral groove, said tube being distorted inwardly to form a detent engaging said groove, a nut on the lower end of said shank engaging said base, a flanged insert disposed in a hole and having a flange overlying the upper of said trays, a threaded connector threadably engaging said tube and said insert, a cup having a bottom resting on said flange, an extension on the upper end of said shank extending up through said cup and terminating in a bifurcated clip having two upwardly extending legs for receiving a card or the like, means engaging said shank clamping said cup to said flange, and means on the lower end of said tube engaging said lower tray, holding said lower tray to said tube.

References Cited in the file of this patent

UNITED STATES PATENTS

| | | |
|---|---|---|
| 1,309,705 | Suck | July 15, 1919 |
| 1,843,951 | Lorentzen | Feb. 9, 1932 |
| 2,719,413 | Panzer | Oct. 4, 1955 |
| 2,755,583 | Loeb | July 24, 1956 |

FOREIGN PATENTS

| | | |
|---|---|---|
| 425,879 | Germany | May 8, 1924 |